United States Patent [19]
Ho

[11] Patent Number: 4,884,609
[45] Date of Patent: Dec. 5, 1989

[54] NO-FLAT TIRE INSERT

[76] Inventor: I-Chung Ho, 6958 Grovespring Dr., Rancho Palos Verdes, Calif. 90274

[21] Appl. No.: 104,332

[22] Filed: Oct. 2, 1987

[51] Int. Cl.⁴ .............................................. B60C 5/06
[52] U.S. Cl. .............................. 152/337.1; 152/338.1; 152/341.1; 152/518
[58] Field of Search ............... 152/337.1, 511, 334.1, 152/518, 331.1, 341.1; 137/223, 516.11; 141/4, 237, 348, 349

[56] References Cited

U.S. PATENT DOCUMENTS

| 807,311 | 12/1885 | Parker | 152/334 |
|---|---|---|---|
| 911,041 | 2/1909 | Hicks | 152/334 |
| 1,080,814 | 12/1913 | Dreger et al. | 152/334 |
| 1,154,817 | 9/1915 | Turner | 152/334 |
| 1,185,660 | 6/1916 | Harris | 152/337.1 |
| 1,226,563 | 5/1917 | Miller | 152/342 |
| 1,334,448 | 3/1920 | Gordon | 152/337.1 |
| 1,420,081 | 6/1922 | Dirienzo | 152/341.1 |
| 1,569,844 | 1/1926 | O'Brien | 152/342 |
| 1,908,244 | 5/1933 | Herron | 152/342 |
| 2,039,343 | 5/1936 | Prokul | 152/342 |
| 2,248,371 | 7/1941 | Matthews | 152/338.1 X |
| 2,269,244 | 1/1942 | Berry | 152/342 |
| 2,354,912 | 8/1944 | Eger | 152/342 |
| 2,440,107 | 4/1948 | Maddox | 152/342 |
| 2,859,791 | 11/1958 | Pellegrino | 152/334 |
| 3,194,180 | 7/1965 | Mackerle | 152/334 |
| 3,494,403 | 2/1970 | Huber | 152/335 |
| 4,054,169 | 10/1977 | Devienne et al. | 152/337 |

Primary Examiner—David Simmons

[57] ABSTRACT

A no-flat tire insert for use in vehicle tires. The tire insert includes a plurality of balloons all connected to a distribution manifold in a valve system. The distribution manifold inflates the plurality of balloons simultaneously during charging. The manifold valve isolates all of the balloons from the valve stem after charging of the insert. Puncture of a small number of balloons will not cause the tire to go flat. The no-flat tire insert can be adapted to any existing tire/wheel without any modification.

15 Claims, 3 Drawing Sheets

NO-FLAT TIRE INSERT

BACKGROUND OF THE INVENTION

This invention relates to a tire and more particularly to an insert for a tire which provides a plurality of chambers within the tire, such that after inflation each chamber is isolated from the others. In this manner, if one or more of the chambers is punctured, the other chambers retain their charge.

In multi-chamber tires where the chambers are structurally separate, it is advantageous to provide a single valve means through which it is possible to inflate and deflate the chambers simultaneously. Separate valves have been used for the separate inner and outer tires; however, such a design is inconvenient, expensive and impractical as it requires special rims and accessories. Others have proposed to use a valve structure that has two separate air valves operating through two separate air passages. In view of the standardization in the industry, a redesign of the rim to accommodate such charge or the use of two valves would be impractical. Therefore, the state-of-the-art valve design for tubeless tires is shown in U.S. Pat. No. 2,818,101; which is hereby incorporated by reference.

The present invention solves these and other problems by providing a multi-chambered inner tube having a single valve which isolates each chamber from the other chambers. The no-flat tire insert is similar to the inner tube of a tire except that the no-flat insert comprises a plurality of balloons connected to a single distribution manifold of a valve stem.

SUMMARY OF THE INVENTION

It is an object of the present invention to provide a tire insert which contains a plurality of balloons to pressurize the tire.

It is another object of the present invention to provide a tire insert wherein the insert does not go flat if several of the balloons are punctured.

It is a further object to provide a no-flat tire insert which includes a plurality of balloons in which all balloons are charged or discharged from a single valve stem.

The no-flat tire insert of the present invention includes a valve housing defining a valve stem, a distribution manifold and a plurality of balloons. The valve stem has a central valve stem bore therein which leads to a manifold chamber. The housing further defins a manifold distribution plate which has a plurality of openings therein, which openings lead to a plurality of chambers, one for each of the plurality of balloons.

A spring-loaded manifold valve is comprised of two generally circular plates connected by a connector. The first of the plates is spring-loaded into contact with the manifold distribution plate, the surface of the plate contains a gasket material thereby closing and sealing the plurality of openings which lead to the plurality of balloons. In order to charge the insert, a pin and extension tube within the valve stem bore are forced against the manifold valve, lifting it off the distribution plate and opening the plurality of openings, thereby allowing charge air to fill the plurality of balloons. At the desired tire pressure, the pressurized source is uncoupled from the valve stem and the manifold valve is biased against the mainfold distribution plate.

The valve of the present invention further comprises a spring-loaded cam which, when the valve stem tip plate and the extension tube are removed, forces the manifold valve to lift off the distribution plate, thereby allowing the charge air to escape from all the balloons simultaneously.

DETAILED DESCRIPTION OF THE INVENTION

Figure 1:
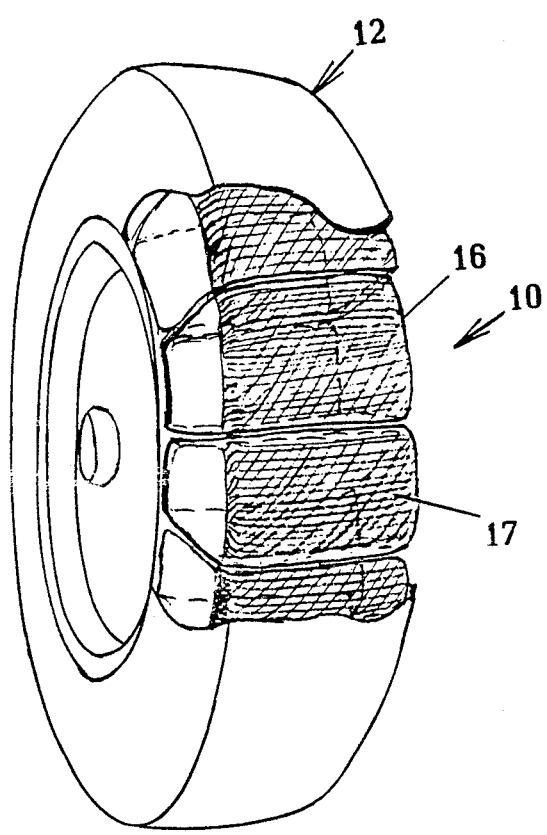
FIG. 1 is a perspective view of the no-flat tire insert of the present invention.
Figure 2:
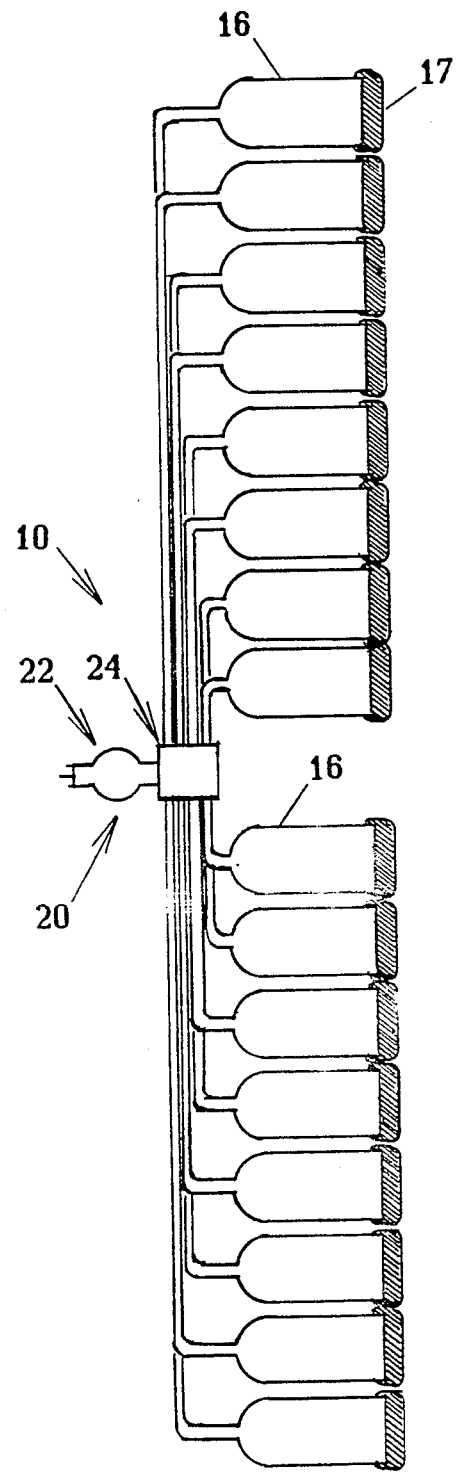
FIG. 2 is a plan view of the no-flat tire insert of the present invention.

FIGS. 1 and 2 show a no-flat tire insert 10 of the present invention in a tire 12. As shown, the no-flat tire insert 10 comprises a plurality of balloons or chambers 16 which are connected to valve 20 which includes a valve stem 22 and a distribution manifold 24 having an outlet connection member 15 for each balloon 16. The balloons 16 are sized such that each is partially filled or pressurized when the tire 12 is filled to the desired pressure. Hence, in order to pressurize the tire, only a few balloons would be necessary. In this manner, several balloons can sustain punctures and the tire pressure be properly inflated. When one of the balloons or chambers is punctured, this balloon will gradually loose its air. The neighboring balloons will cause the wall of this punctured balloon to collapse or fold toward the puncture point thus forming a cushion around the nail or other foreign object which caused the puncture thus preventing further damage to other balloons.

Charging of the balloons 16 can best be described in relation to the valve 20 as shown in FIGS. 3 to 6. Valve 20 forms a housing 26 constructed of suitable material. Housing 26 defines a valve stem bore 28, including a valve nozzle 25 with opening 29, within the valve stem 22 and manifold chamber 30 within the distribution manifold 24.

Figure 3:
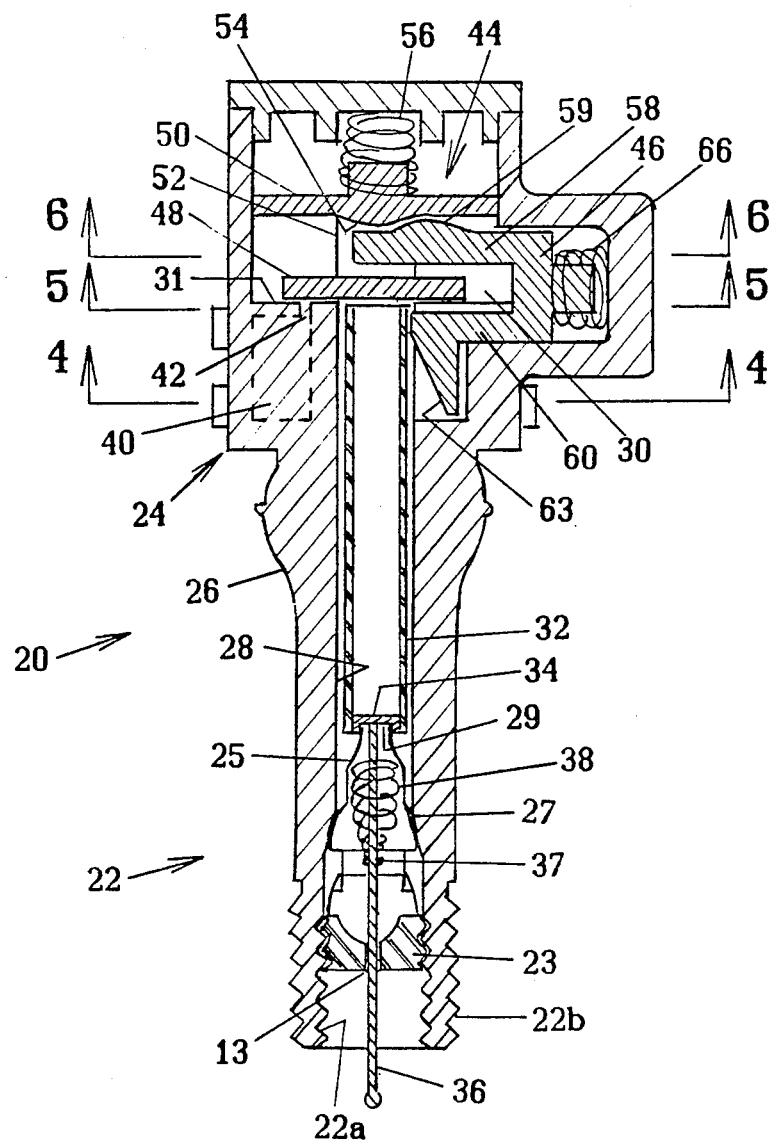
FIG. 3 is a cross-sectional view of the valve utilized in the present invention.
Figure 4:
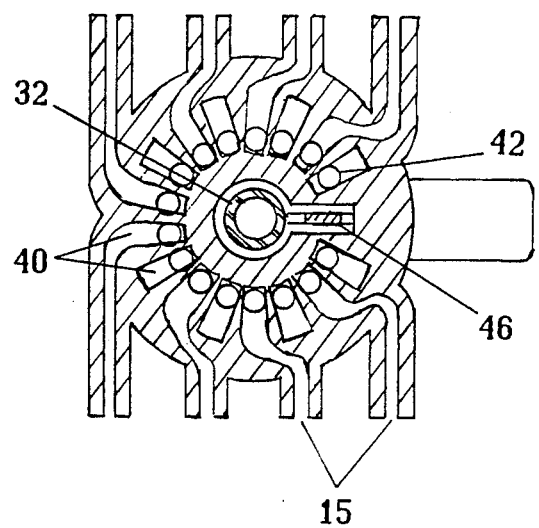
FIG. 4 is a cross-section view of the valve taken along line 4—4 of FIG. 3.
Figure 5:
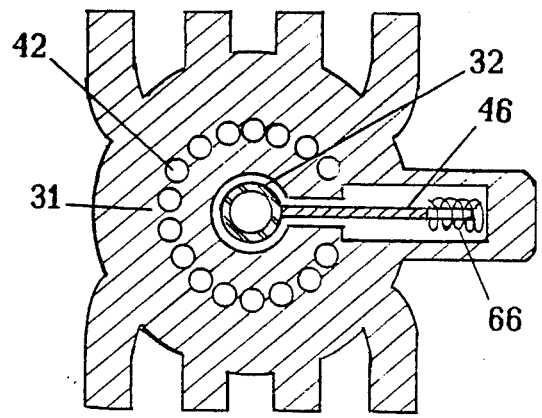
FIG. 5 is a cross-sectional view of the valve taken along line 5—5 of FIG. 3.
Figure 6:
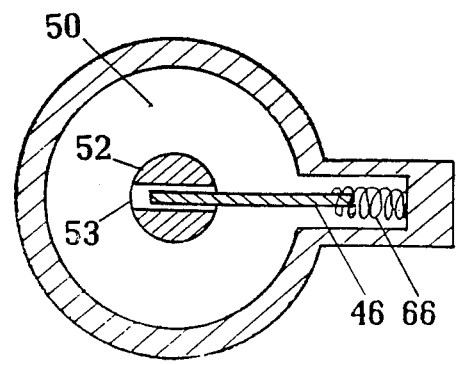
FIG. 6 is a cross-sectional view of the valve taken along line 6—6 of FIG. 3.

As can be best seen in FIG. 3, valve stem 22 includes a portion which is threaded on its inner and outer surfaces, 22a and 22b repesctively. A valve stem tip plate 23 is threadable and engageable with the threads 22a on the inner surface of valve stem 22. Valve stem tip plate 23 is attached to a cylindrically shaped valve nozzle 25 having an annular seal 27 therearound for sealing within the valve stem 22. A spring loaded needle pin 36 is located through a hole 13 in the valve stem tip plate 23 which maintains the pin 36 in its proper position. Spring-loaded pin 36 is attached to valve cover plate 34 which in turn is secured to an extension tube 32. One end of the spring 38 is attached to the pin 36 at a shoulder 37 and the other end of the spring 38 is wedged against cylindrical valve nozzle 25 such that it biases the pin and therefore the valve cover plate 34 and the extension tube 32 downward as shown in FIG. 3, i.e. closing the valve nozzle opening 29. Extension tube 32 is slidable within bore 28 and extends the length thereof.

As shown in FIGS. 3–6, the distribution manifold 24 of the no-flat tire insert comprises a plurality of chambers 40 (FIG. 3) which are formed within the housing, each chamber 40 having a passageway 42 connecting the manifold chamber 30 with one of the chambers 40. The housing 26 defines a manifold distribution surface 31 which includes the plurality of passageways 42. Each of the plurality of chambers 40 is in turn connected through its outlet connection member 15 to one of said plurality of balloons 16, see FIG. 4.

Valve 20 further includes an internal manifold valve 44 and cam 46. Internal valve 44 comprises first and second end plates, 48 and 50 respectively, connected by a connector 52. These end plates are generally flat and circular. Connector 52 includes a groove or slit 53 which runs the length of the connector between the two plates as can best be seen in FIG. 6. On the second end plate 50 formed within the slit 53 is a hump 54, whose function will be explained below. Internal manifold valve 44 is biased via manifold valve spring 56 so that first end plate 48 of the internal manifold valve 44 is pressed against the distribution surface 31 to close all passageways 42. The distribution surface 31 has circular rims around each passageway 42 and the first end plate has a proper gasket material on its surface to insure proper sealing.

Cam 46 is a generally U-shaped article wherein one leg 58 thereof includes a surface having a ridge 59 thereon which cooperates with the hump 54 on internal manifold valve 44. The other leg 60 of cam 46 includes a ramp or inclined surface 63.

During charging of the no-flat tire insert 10, the pin 36 and therefore the valve cover plate 34 and extension tube 32 are forced upward which opens valve nozzle opening 29 as shown in FIG. 3 by the charging apparatus which in turn compresses inner valve spring 56. Internal manifold valve 44, and in particular the plate 48 are lifted from the manifold distribution surface 31 opening passageways 42. Pressurized air flows through the valve stem tip plate 23, valve nozzle 25 and valve stem bore 28, enters the manifold chamber 30 and thereafter simultaneously fills each balloon via passageways 42 and chambers 40. When the insert 10 reaches the desired pressure, the air pressure source is removed from the valve allowing the pin 36 and extension tube 32 and valve cover plate 34 to be biased downward by spring 38, closing the valve nozzle opening 29. Also, spring 56 springs manifold valve 44 downward, closing passageways 42 therefore isolates all balloons from each other.

In order to discharge the air in the no-flat insert 10, the valve stem tip plate 23, pin 36, spring 38, valve nozzle 25, valve nozzle cover plate 34 and extension tube 32 are removed by unscrewing the valve stem tip plate 23 from the vale stem 22. The removal of the extension tube 32 will cause cam spring 66 to move the cam 46 to the left as shown in FIG. 3 which in turn, due to the hump surface 54 on internal manifold valve 44 and ridge 59, on cam 46, lifts inner valve 44 from its sealing engagement with the manifold distribution plate 31. This movement of inner manifold valve 44 opens passageways 42 and enables the air in each balloon 16 to escape through valve stem bore 29.

When one of the balloons is punctured by a foreign object such as a nail, that balloon will loose its charge from pressure of nearby uneffected balloons. The surface wall of the balloon is likely to collapse and fold toward the puncture and therefore form a cushion around the nail to prevent further damage to other balloons. The surface of the balloon may even be padded with a light weight foam material 17 to increase the cushion thickness. The foam material 17 can be placed either on the inside surface or the outside surface of the balloons.

Various modifications to the depicted and described apparatus will be apparent to those skilled in the art. Accordingly, the foregoing detailed description of the preferred embodiment should be considered exemplary in nature and not as limiting to the scope and spirit of the invention as set forth in the appended claims.

What is claimed is:

1. A no-flat tire insert comprising:
   a plurality of balloons, each of said plurality of balloons occupying only a portion of the insert circumference;
   a single valve means for simultaneously charging or discharging said plurality of balloons, said valve means opened by a spring-loaded pin and including a valve stem means, defining a central valve stem bore therethrough and a distribution manifold, within said valve stem means, defining a manifold chamber flow connected to said valve stem bore and a manifold distribution surface within said manifold chamber having a plurality of openings therein, each of said openings flow connected to one of said plurality of balloons; and
   internal manifold valve means for opening and closing said plurality of openings on said distribution surface and said central valve stem including
   a first and a second generally circular plate;
   a connector located therebetween, thereby connecting said plates in generally parallel relationship a desired distance apart; and
   a spring means for biasing said first plate into contact with said distribution manifold.

2. The no-flat tire insert of claim 1 wherein said connector includes a slit therethrough, said slit extends from one plate to the other along the axis of said connector.

3. The no-flat tire insert of claim 2 wherein said second plate includes a bump on its one surface, said bump extends into said slit formed in said connector.

4. The no-flat tire insert of claim 1 wherein said spring means for biasing said first plate of the valve into contact with said manifold distribution surface, causing the closure of plurality openings from the manifold.

5. A no-flat tire insert comprising:
   a plurality of balloons, each of said plurality of balloons occupying only a portion of the insert circumference; and
   a single valve means for simultaneously charging or discharging said plurality of balloons, said valve means opened by a spring-loaded pin, said single valve means including:
   a valve stem defining a central bore therethrough;
   a valve nozzle including a generally cylindrically shaped stem tip housing having an annular seal therearound;
   a pin extending through said valve stem housing;
   a valve nozzle cover plate attached to one end of said pin and sized to close one end of said valve nozzle;
   a spring means for biasing said pin such that said valve nozzle cover plate closes one end of said valve nozzle opening;
   means for securing said valve nozzle into said valve stem within said valve stem bore;

an extension tube secured to said valve nozzle cover plate and extending the length of the valve stem bore from said valve nozzle cover plate; and a distribution manifold, within said valve stem means, defining a manifold chamber flow connected to said valve stem bore and a manifold distribution surface within said manifold chamber having a plurality of openings therein, each of said openings flow connected to one of said plurality of balloons.

6. A no-flat tire insert comprising:

a plurality of balloons, each of said plurality of balloons occupying only a portion of the insert circumference;

a single valve means for simultaneously charging or discharging said plurality of balloons, said valve means opened by a spring-loaded pin and including a valve stem means, defining a central valve stem bore therethough, and a distribution manifold, within said valve stem means, defining a manifold chamber flow connected to said valve stem bore and a manifold distribution within said manifold chamber having a plurality of openings therein, each of said openings flow connected to one of said plurality of balloons; and a cam means for opening said internal manifold valve during discharge of said balloons.

7. The no-flat tire insert of claim 6 wherein said cam means comprises:

a generally U-shaped member having two legs, one leg includes a ridge which faces the bump of the first plate of the internal manifold valve and the other leg includes an inclined ramp surface; and spring means for biasing said U-shaped member against the manifold valve and extension tube; said ridge in contact with the bump of the manifold valve and said inclined ramp surface against the extension tube.

8. The no-flat tire insert of claim 7 wherein each balloon of said plurality of balloons is connected to each of said plurality of outlet connection members such that pressurized air is simultaneously charged or discharged for each of said plurality of balloons.

9. A no-flat tire insert comprising:

a housing defining a valve stem section and a distribution manifold section, said valve stem section including a central bore therethrough and having internal threads at one end thereof, said distribution manifold section defining a chamber therein in flow communication with said central bore and including a plurality of outlet connection members;

a balloon connected to each outlet connection member;

valve means, secured within said valve stem section, for opening and closing said central bore with respect to the environment, said valve means comprising:

a generally cylindrically shaped valve stem housing threadably engageable within said central bore;

an annular seal secured around a portion of said valve stem housing;

a pin extending from one end of said valve stem housing to a point outside of said housing;

a valve cover plate attached to said pin, at one end thereof, said valve cover plate sized to seal one end of said valve stem housing;

spring means, attached to said pin, for biasing said cover plate into engagement with said valve stem housing;

an extension tube attached to said cover plate and extending from the cover plate to the chamber in said manifold distribution means; and manifold distribution means located within said distribution manifold section for distributing pressurized air to and collecting pressurized air from each balloon.

10. The no-flat tire insert of claim 9 wherein said manifold distribution means comprises:

a generally flat distribution plate having a plurality of openings therein, each opening flow connected to a single outlet connection member; and a spring loaded internal valve means for simultaneously opening and closing said plurality of openings on said distribution plate.

11. The no-flat tire insert of claim 10 wherein said internal valve means comprises a first and a second generally circular plates and a connector therebetween, said first plate sized such that it covers the plurality of openings when in contact with said distribution surface; and a valve spring attached to said second plate and biasing said first plate into contact with said distribution surface;

the surface of said first plate includes a suitable gasket material which forms an air tight seal against distribution openings when in contact with the distribution surface and the distribution surface includes circular rims around each passageway forming a valve seat for the cover plate.

12. The no-flat tire insert of claim 11 wherein said connector includes a slit therethrough extending between said first and second plate.

13. The no-flat tire insert of claim 12 wherein said second plate includes a bump on the side opposite said valve spring and extending into said slit in said connector.

14. The no-flat tire insert of claim 13 further comprising a cam means for biasing said first plate out of contact with said distribution surface.

15. The no-flat tire insert of claim 14 wherein said cam means comprises a generally U-shaped member having two legs, one leg includes a ridge and the other leg includes an inclined ramp surface; and spring means for biasing said U-shaped member into said slit in said spacer.

* * * * *